United States Patent [19]

Hosokawa et al.

[11] Patent Number: 4,746,970

[45] Date of Patent: May 24, 1988

[54] WHITE UNIFORMITY CORRECTING APPARATUS FOR A THREE-COLOR DISPLAY WHEREIN CORRECTION SIGNALS ARE STORED IN A MEMORY

[75] Inventors: Hiromu Hosokawa, Chiba; Ryosuke Ashiya, Tokyo; Koichi Momoi, Kanagawa, all of Japan

[73] Assignee: Sony Corporation, Tokyo, Japan

[21] Appl. No.: 819,154

[22] Filed: Jan. 14, 1986

[30] Foreign Application Priority Data

Jan. 9, 1985 [JP] Japan .................................... 60-1788

[51] Int. Cl.⁴ .................... H04N 9/73; H04N 9/12; H04N 9/16; H04N 17/02
[52] U.S. Cl. .................................... 358/29; 358/10; 358/56; 358/64
[58] Field of Search ................. 358/10, 56, 59, 60, 358/64, 65, 66, 74, 163, 29

[56] References Cited

U.S. PATENT DOCUMENTS

| | | | |
|---|---|---|---|
| 4,122,485 | 10/1978 | Sonntag et al. | 358/10 |
| 4,137,548 | 1/1979 | Kelly et al. | 358/10 |
| 4,631,576 | 12/1986 | St. John | 358/65 |

FOREIGN PATENT DOCUMENTS

| | | | |
|---|---|---|---|
| 0184901 | 6/1986 | European Pat. Off. | |
| 1817464 | 8/1969 | Fed. Rep. of Germany | 358/64 |
| 3311971 | 10/1984 | Fed. Rep. of Germany | 358/60 |
| 41932 | 4/1978 | Japan | 358/10 |
| 115137 | 10/1978 | Japan | 358/60 |
| 105925 | 8/1979 | Japan | 358/29 |
| 121777 | 9/1980 | Japan | 358/29 |
| 13879 | 1/1982 | Japan | 358/60 |
| 51676 | 3/1983 | Japan | 358/163 |
| 123288 | 7/1983 | Japan | 358/64 |
| 146190 | 8/1983 | Japan | 358/64 |
| 2127616 | 4/1984 | United Kingdom | |

OTHER PUBLICATIONS

Kinameri, Kanji, et al., "White Uniformity Measurements on Color TV Picture Tubes", *Applied Optics*, 1 Jan. 1979, vol. 18, No. 1, pp. 135-140.

Hagiwara, Hiroshi, et al., "45-inch Projection Receivers", *Toshiba Review*, No. 132 (Mar.-Apr. 1981), pp. 37-43.

*Primary Examiner*—James J. Groody
*Assistant Examiner*—Randall S. Svihla
*Attorney, Agent, or Firm*—Hill, Van Santen, Steadman & Simpson

[57] ABSTRACT

A dynamic white uniformity correcting apparatus for a three-color display for displaying a color picture in response to three primary color signals and includes a cathode ray tube which has means for emitting a plurality of electron beams and a display screen divided into a plurality of incremental areas and the display also includes deflection means for scanning the plurality of electron beams across the display screen to produce the color picture in response to three primary color signals and wherein a correction signal generating means generates at least two correction signals for each incremental area of the display screen and the correction signal generating means includes a correction signal storage means for storing the correction signals. At least two amplitude modulators are provided for adjusting the level of different ones of the three primary color signals as a function of the correction signals and means for reading out the correction signals from the correction signal storage means as the plurality of electron beams are scanned across the incremental areas of the display screen so as to supply read out correction signals to the amplitude modulators to adjust the levels of the primary color signals to correct the white uniformity of the color picture.

3 Claims, 2 Drawing Sheets

WHITE UNIFORMITY CORRECTING APPARATUS FOR A THREE-COLOR DISPLAY WHEREIN CORRECTION SIGNALS ARE STORED IN A MEMORY

BACKGROUND OF THE INVENTION

1. Field of the Invention

The invention relates in general to color receivers such as a monitor receiver and a high resolution television receiver which requires high display accuracy.

2. Description of the Prior Art

In prior art color receivers, it is very difficult to obtain white display on a cathode ray tube and for fine pitch cathode ray tubes is very difficult to produce an accurate and desirable cathode ray tube. In color receivers depending on the different light emission characteristics of the three primary color phosphors, the deviation of the coating width of the color phosphors and other factors, the white uniformity of the colors which are displayed are deteriorated. Even if certain areas of the cathode ray tube have correct white color, other areas such as the edges of the tube may not have the proper white color signal. So as to solve this problem in the prior art, during production quality control of the cathode ray tube requires great accuracy during manufacturing which increases the cost of satisfactory receivers for standard television systems.

However, in a color receiver such as color monitor receivers and high resolution television receivers which require a high display accuracy, it is required that the color phosphors stripes be narrow in width and that the receivers have a small screen. For such cases, a satisfactory results cannot be obtained by using the prior art high quality manufacturing techniques. Also, the yield of the product is substantially reduced when using severe quality management techniques in production which makes the receivers very expensive.

Thus, the prior art color television such as monitor receivers and high resolution television receivers require a high display accuracy, but they are very difficult to manufacture and are very costly.

SUMMARY OF THE INVENTION

The present invention provides a dynamic uniformity correcting apparatus comprising signal generating means such as memories for generating a correction signal for respective areas of a picture screen which is divided into incremental areas and amplitude modulators which may be multipliers are provided in at least two signal paths of the three primary color signals. The beam of the cathode ray tube is deflected by a video signal to different areas of the screen and the signal generating means generates a correcting signal and the generated correcting signal is supplied to the amplitude modulator to control the amplitudes of at least two primary color signals and, thus, to correct for color non-linearities on the picture screen and to make the colors uniform.

According to the present invention, since the uniformity can be dynamically corrected even for a color receiver such as a monitor receiver and a high resolution television receiver which requires a high display accuracy, high quality tubes can be easily obtained. Also, the correction can be subsequently made after production and the yield of the products will be substantially improved thus reducing the cost of such monitor receivers and high resolution receivers.

In the application, a circuit compensates for unsatisfactory white color and stored corrections are maintained in a field memory and such corrections are used for white color correction. A microcomputer may be used either inside or outside of the TV set and a large number of photo-sensors as, for example, about 100 photo-sensors can be placed on the face of the cathode ray tube and a white signal is applied and calculations are made and a feedback loop is provided until the white picture color is obtained. The value of the white signal is memorized for each position in the field and, thus, the area information for the correction required at each position on the face of the cathode ray tube is provided. The cathode ray tube may be divided into different incremental areas such as 8, 16, 32 or 100 areas, for example.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

DESCRIPTION OF THE PREFERRED EMBODIMENTS

Figure 1:
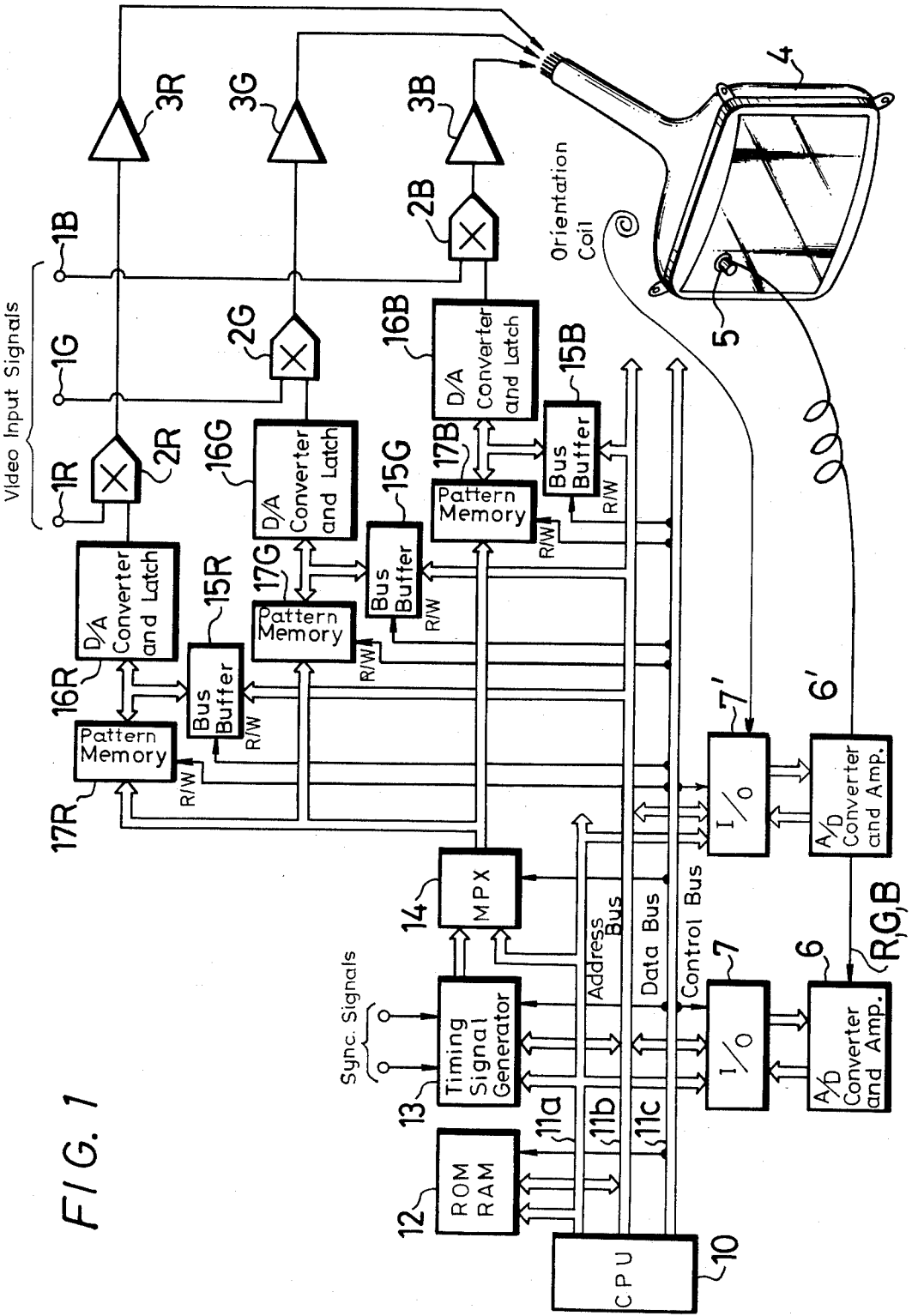
FIG. 1 is a schematic diagram illustrating an example of the present invention.

FIG. 1 illustrates the correction circuit of the invention and three input terminals 1R, 1G and 1B are provided to which are respectively supplied the video signals for the three colors red R, green G, and blue B, respectively. Signals from input terminals 1R, 1G and 1B are respectively supplied to multipliers 2R, 2G and 2B which also receive correcting signals so as to modify the input signals to a corrected value. The output of the multipliers 2R, 2G and 2B are respectively applied to amplifiers 3R, 3G and 3B and then to the electron gun of a receiver tube 4. On the face of the picture screen of the receiver tube 4, will be displayed a picture which corresponds to the video signals supplied to the input terminals 1R, 1G and 1B.

In the invention, the correction for uniformity is made as follows. A photo-sensor 5 is placed in a particular area of the face of the picture tube 4 while signals which will display the white color are supplied to the input terminals 1R, 1G and 1B. Thus, a single white color display is accomplished in a particular area of the picture screen of the picture tube 4. The photo-sensor 5 measures on a predetermined area of the picture screen respective light emission or developing amounts of the three colors at that area. The measured signals are fed to an amplifier and analog to digital converter circuit 6 and the converted digital data is supplied to an input-/output circuit 7.

A microprocessor CPU 10 is connected to an address bus 11a, a data bus 11b and a control bus 11c. A system memory 12 which might contain ROMs and/or RAMs is also connected to the buses 11a, 11b and 11c as is the input/output circuit 7. The memory 12 has a read-only memory ROM in which a program is written and a random access memory RAM which provides data processing and according to the program written into the ROM, the data from the input/output circuit 7 is processed.

A timing signal generator 13 receives the synchronizing signal from the video signal and is connected to the buses 11a, 11b and 11c. The generator 13 forms an address signal which corresponds to the scanning position on the picture screen which is fed to one input terminal of a multiplexer MPX 14. Another input terminal of the MPX 14 receives an address signal which is generated in the CPU 10 through the address bus 11a. The MPX 14 changes over in response to a control signal from the CPU 10 supplied by the control bus 11c.

The data from the I/O circuit 7 which is processed by the CPU 10 is supplied through the data bus line 11b to bus buffers 15R, 15G and 15B and is stored therein in response to the control signals from the control bus 11c. The data from the bus buffers 15R, 15G and 15B are respectively fed to latch and digital to analog converting circuits 16R, 16G and 16B and are converted to analog signals which are respectively supplied to multipliers 2R, 2G and 2B. The data from the CPU 10 is sequentially changed and provides the respective correcting data by which the light emission of the three colors to be measured by the photo-sensor 5 are balanced and determined. It is to be realized, of course, that the photo-sensor 5 is moved to different areas to obtain the correcting data for the other incremental areas of the face of the cathode ray tube 4. Alternatively, of course, it is to be realized that a number of photo-sensors may be simultaneously applied to the face of the cathode ray tube 4 and the color correction data obtain for each of the photo-sensors is thus provided so as to obtain the correcting data for the entire surface of the cathode ray tube.

The correcting data thus determined are fed from the bus buffers 15R, 15G and 15B to the pattern memories 17R, 17G and 17B respectively and the address signal from the MPX 14 is supplied to the memories 17R, 17G and 17B and the control signals from the control bus 11c are supplied to the memories 17R, 17G and 17B at their write/read control terminals. This causes the MPX 14 to be changed to the side of the address bus 11a through the control bus 11c to cause the memories 17R, 17G and 17B to be placed in the write-in mode so that data from the I/O circuit 7 which has been processed by the CPU 10 is written into the memories 17R, 17G and 17B at their desired addresses.

The amount of light emissions at a predetermined area on the picture screen of the receiver tube which are detected by the photo-sensor 5 are analog to digital converted and then fed to the CPU 10. Thus, the correcting signals are formed which balance the amount of light emission of the three colors R, G and B at that time. The correcting signals are written into the memories 17R, 17G and 17B at the addresses corresponding to the predetermined area of the picture tube which is being monitored by the photo-sensor 5. Then such writing is carried out at every area of the picture tube which is suitably divided for such purpose. For example, correcting signals at 100 different areas on the picture screen can be written into the memories 17R, 17G and 17B at addresses corresponding to the particular area. It is to be realized, of course, instead of using 100 incremental areas on the face of the cathode ray tube 4, that the face may be divided into 32, 16, 8 or other incremental areas if desired.

Next, when the written correcting signal is used to perform correction, the video signals will be applied to input terminals 1R, 1G and 1B to be corrected and displayed. Also, synchronizing signals which are separated from the video signal will be supplied to the timing generator 13 at the terminals indicated. Then the MPX 14 will be switched to the side of the generator 13 to cause the memories 17R, 17G and 17B to be put into the read-out mode. Thus, the memories 17R, 17G and 17B will produce read-out correcting signals corresponding to the respective areas on the picture screen in response to the deflection of the video signal. In other words, the correcting signals correspond to the position to which the beam of the cathode ray tube has been deflected. Such correcting signals are respectively fed to the latch and digital to analog converting circuits 16R, 16G and 16B which produce converted analog correcting signals that are supplied to the multipliers 2R, 2G and 2B respectively so as to cause the colors to be displayed in a uniform manner.

Figure 2:
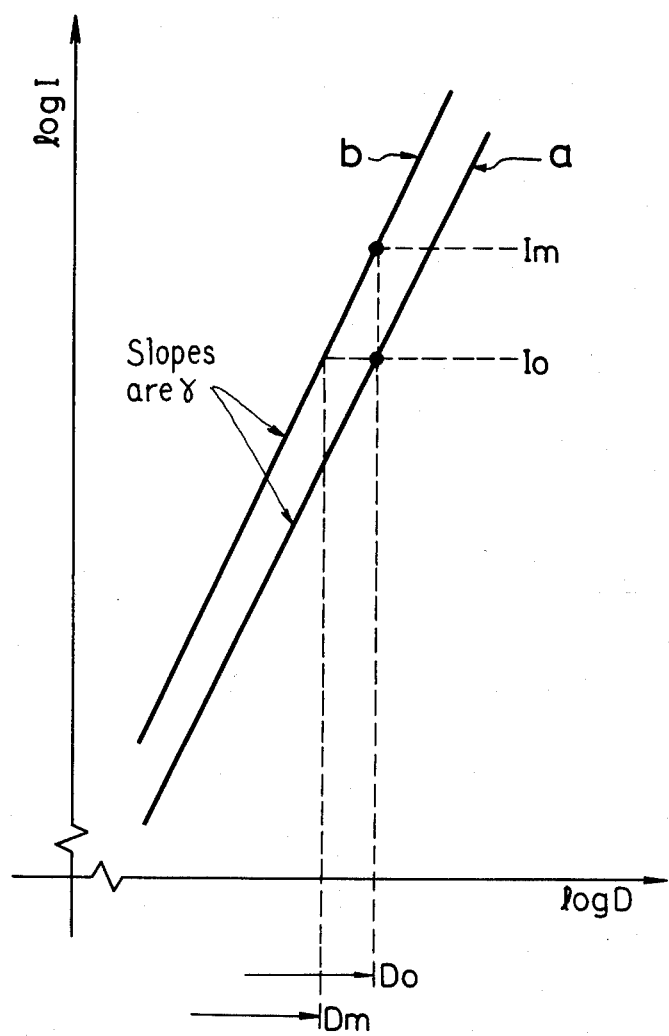
FIG. 2 is a graph used to explain the invention.

Thus, in the apparatus of the invention, the relationship between the drive voltage D and the brightness I which is the light emission of the receiver tube 4 will be as shown in FIG. 2. In the graph of FIG. 2, the slope of a straight line is a so-called $\gamma$. In FIG. 2, when at a desired point on the picture screen, two other colors have ideal characteristics, a straight line a represents the drive characteristic of the cathode for the remaining color so as to make the colors uniform. The characteristics of the straight line a is expressed as follows:

$$\log I = \gamma \cdot \log D$$

On the other hand, a straight line b represents the characteristic where the characteristic is increased by $\alpha$ times that of the straight line a for the same reason. The characteristic of the straight line b is expressed as follows:

$$\log I = \log \alpha + \gamma \cdot \log D$$

When a drive voltage $D_o$ is applied, an ideal light intensity $I_o$ is expressed by the straight line a as follows:

$$I_o = D_o^\gamma$$

However, the light intensity Im obtained by the characteristic of the straight line b becomes in practice as follows:

$$Im = \alpha D_o$$

Therefore, in order that the light intensity obtained, when the applied drive voltage is selected to be Dm, is made to have an ideal value, it is sufficient that the following expression be established:

$$D_o^\gamma = \alpha D_m^\gamma$$

$$\therefore D_m = D_o \frac{1}{\alpha^{\frac{1}{\gamma}}}$$

In the above expression $(1/\alpha 1/\gamma)$ is an inherent constant for each point of the picture screen. When the inherent drive signal is multiplied (amplitude-modulated) with the above constant, the characteristics of the line b at this point can be converted to the line a and hence the ideal light intensity for the black level for the highlight portion can be obtained.

In the manner described above, the light emissions of the three colors at a desired area on the picture screen are corrected and the displayed colors will be made uniform. In this case, since the characteristic of the uniformity of the receiver tube depends on how the light emission balance of the three colors over the whole picture screen is maintained, the above correction of the drive signal is carried out for each of the three colors and further this is developed in a two dimensional manner according to the deflection of the video signal for each area of the tube. Thus, the ideal light emission balance can be established over the entire face of the picture screen and the uniformity of the display colors will be obtained.

As described above, according to the apparatus of the invention, since the uniformity can be dynamically corrected, a color receiver such as a monitor receiver and a fine pitch cathode ray tube television receiver which requires a high display accuracy of good quality can be obtained with the present invention. Also, since the correction can be made after production of the tube, the yield of the tubes will be high and, thus, the cost of the tubes will be decreased as compared to the cost of those of the prior art.

In the invention, the receiver tube 4 has a characteristic such that generally the peripheral portion of its picture screen becomes dark due to structural problems. In this case, in the apparatus, if the correction to keep the absolute luminance levels of the three colors constant is performed, the above described darkness on the peripheral portion will be corrected and hence uniform brightness over the whole picture screen will be obtained. On the other hand, when the desired uniform brightness over the whole picture screen can be established without the above correction for example, the green can be used as a reference and only the two other colors need be corrected. In this case, the multiplier 2G, the bus buffer 15G, the D/A converting circuit 16G and the memory 17G for the green color can be eliminated.

In the above apparatus, it is possible that the photosensor 5 may comprise a photo-diode or a photo-transistor which can obtain the luminance information of the picture screen beneath the sensor.

Also, in the apparatus, the memories 17R, 17G and 17B may each be a RAM having a battery back-up. Also, since the correcting value is determined during manufacturing the receiver tube, it may be possible that the correcting value may be determined on the manufacturing line and may be then written into an EEPROM. For this case, the CPU 10 and related structures are not necessary for each receiver. In such a case, the automatic detection by the CPU is difficult, but the correcting value is manually obtained by watching the picture screen or by using a photo-meter. Also, when a RAM or a ROM is employed, the correcting value may be manually measured.

Although the above correcting values are determined at the respective areas of the picture screen which is divided and then memorized, the areas may be interpolated using linear approximation.

Also, the above correction of the uniformity may be varied according to the direction of the picture screen and its orientation relative to the earth's magnetic field. It is well known that the earth's magnetic field effects the deflection and operation of cathode ray tubes. For this case, if the EEPROM is used, an error will result. Therefore, when the ROM is used, it may be possible that the correcting values for the picture screen for eight directions can be respectively written into the ROM and the correcting value will be selected and used depending on the particular orientation of the picture screen. For this case, the change-over may be manually carried out automatically by using a Hall element or a magneto-sensitive element, a magnetic needle or other similar apparatus. So as to correct for the orientation of the screen relative to the earth's magnetic field, an orientation coil illustrated in FIG. 1 may be mounted in a fixed relationship to the cathode ray tube 4 and supplies an input to a second A/D converter and amplifier 6' which supplies and receives signals to and from a second I/O device 7'. Such an arrangement makes it possible for CPU 10 to determine the orientation of the screen and select the appropriate correcting values from the ROM.

Thus, according to the invention since the uniformity can be dynamically corrected, a color receiver such as a monitor receiver or a high definition television receiver which requires high display accuracy of high quality can be made according to the invention. Since the correction can be made after production of the receiver, the yield will be substantially improved thus decreasing the cost.

Although the invention has been described with respect to preferred embodiments, it is not to be so limited as changes and modifications may be made therein which are within the full intended scope as defined by the appended claims.

We claim as our invention:

1. A dynamic white uniformity correcting apparatus for a three-color display, said display being for displaying a color picture in response to three primary color signals and comprising a cathode-ray tube, said cathode-ray tube comprising means for emitting a plurality of electron beams and a display screen divided into a plurality of incremental areas, said display further comprising deflection means for scanning said plurality of electron beams across said display screen to produce said color picture in response to said three primary color signals, said apparatus comprising: a correction signal generating means for generating at least two correction signals for each incremental area of said display screen, said correction signal generating means comprising a correction signal storage means for storing said correction signals; at least two amplitude modulators, each of said amplitude modulators being for adjusting the level of a different one of said three primary color signals in response to a corresponding one of said correction signals; and means for reading out said correction signals from said correction signal storage means as said plurality of electron beams are scanned across corresponding incremental areas of said display screen, and for supplying said read-out correction signals to said amplitude modulators to adjust the levels of the corresponding primary color signals, thereby correcting the white uniformity of said color picture displayed on said display screen, wherein said correction signal storage means comprises a plurality of pattern memories, each of said pattern memories corresponding to a different orientation of said display screen relative to the earth's magnetic field, and wherein said reading out means reads out said correction signals from the pattern memory corresponding to the particular orientation of said display screen relative to the earth's magnetic field.

2. A dynamic white uniformity correcting apparatus for a three-color display according to claim 1, wherein said correction signal storage means comprises a digital memory.

3. A dynamic white uniformity correcting apparatus for a three-color display according to claim 1, further comprising a microprocessor for controlling said correction signal storage means.

* * * * *